US008230555B2

(12) United States Patent
Browne et al.

(10) Patent No.: US 8,230,555 B2
(45) Date of Patent: Jul. 31, 2012

(54) ACTIVE MATERIAL BASED FASTENERS INCLUDING CABLE TIES AND TWIST TIES

(75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 12/051,178

(22) Filed: Mar. 19, 2008

(65) Prior Publication Data

US 2009/0235494 A1 Sep. 24, 2009

(51) Int. Cl.
*B65D 63/10* (2006.01)
(52) U.S. Cl. ............ 24/16 PB; 24/17 AP; 24/16 R
(58) Field of Classification Search ............ 24/306, 24/442, 16 PB, 17 AP, 602, 603, 591.1; 606/151, 606/78, 74, 223
See application file for complete search history.

(56) References Cited

U.S. PATENT DOCUMENTS

| | | | | | |
|---|---|---|---|---|---|
| 3,469,289 | A | * | 9/1969 | Whitacre | 24/450 |
| 3,684,994 | A | * | 8/1972 | Tyler | 337/140 |
| 3,753,792 | A | * | 8/1973 | Tyler | 148/563 |
| 4,424,865 | A | * | 1/1984 | Payton, Jr. | 166/302 |
| 4,730,615 | A | * | 3/1988 | Sutherland et al. | 606/215 |
| 5,191,166 | A | * | 3/1993 | Smirlock et al. | 89/36.02 |
| 5,388,617 | A | * | 2/1995 | Sasaki et al. | 138/99 |
| 5,547,049 | A | * | 8/1996 | Weiss et al. | 188/267.2 |
| 5,549,619 | A | * | 8/1996 | Peters et al. | 606/151 |
| 5,669,120 | A | * | 9/1997 | Wessels et al. | 24/446 |
| 5,766,218 | A | * | 6/1998 | Arnott | 606/151 |
| 5,815,891 | A | * | 10/1998 | Students et al. | 24/16 PB |
| 5,983,467 | A | * | 11/1999 | Duffy | 24/442 |
| 6,336,928 | B1 | * | 1/2002 | Guerin et al. | 606/282 |
| 6,388,043 | B1 | * | 5/2002 | Langer et al. | 528/80 |
| 6,598,274 | B1 | * | 7/2003 | Marmaropoulos | 24/451 |
| 6,752,154 | B2 | * | 6/2004 | Fogarty et al. | 128/899 |
| 6,815,873 | B2 | * | 11/2004 | Johnson et al. | 310/331 |
| 7,005,989 | B2 | * | 2/2006 | Benoit et al. | 340/572.5 |
| 7,479,878 | B2 | * | 1/2009 | Maki et al. | 340/566 |
| 7,628,116 | B2 | * | 12/2009 | Browne et al. | 116/216 |
| 2004/0074061 | A1 | * | 4/2004 | Ottaviani et al. | 24/442 |
| 2004/0074063 | A1 | * | 4/2004 | Golden et al. | 24/442 |
| 2004/0074064 | A1 | * | 4/2004 | Powell et al. | 24/442 |
| 2004/0074067 | A1 | * | 4/2004 | Browne et al. | 24/442 |
| 2004/0074068 | A1 | * | 4/2004 | Browne et al. | 24/442 |
| 2004/0074071 | A1 | * | 4/2004 | Golden et al. | 24/442 |
| 2004/0210282 | A1 | * | 10/2004 | Flock et al. | 607/96 |
| 2005/0222558 | A1 | * | 10/2005 | Baxter et al. | 606/16 |
| 2005/0246873 | A1 | | 11/2005 | Tachauer et al. | |
| 2005/0267492 | A1 | * | 12/2005 | Poncet et al. | 606/114 |

(Continued)

OTHER PUBLICATIONS

Written Opinion of the International Searching Authority—PCT/US2009/035963 dated Oct. 12, 2009.

(Continued)

*Primary Examiner* — Robert J Sandy
*Assistant Examiner* — Rowland D Do
(74) *Attorney, Agent, or Firm* — Quinn Law Group, PLLC

(57) ABSTRACT

Active material based fasteners that are reversible are provided. These fasteners can be in the form of, for example, cable ties and twist ties. In an embodiment, a fastener for securing an object comprises: a flexible elongated member capable of at least partially surrounding the object; and an adjustment mechanism in operable communication with the flexible elongated member, the adjustment mechanism comprising an active material capable of undergoing a change in a property upon exposure to an activation source, wherein the elongated member is configured to engage or release the object in response to the change in the property.

20 Claims, 3 Drawing Sheets

U.S. PATENT DOCUMENTS

2006/0264954 A1* 11/2006 Sweeney et al. ............... 606/73
2006/0271074 A1* 11/2006 Ewers et al. ............... 606/148
2007/0179335 A1* 8/2007 Gertner et al. ............... 600/37
2008/0033230 A1* 2/2008 Bartning et al. ............... 600/29

OTHER PUBLICATIONS

International Search Report of the International Searching Authority—PCT/US2009/035963 dated Oct. 12, 2009.

* cited by examiner

ACTIVE MATERIAL BASED FASTENERS INCLUDING CABLE TIES AND TWIST TIES

BACKGROUND

The present disclosure generally relates to fasteners, and more particularly, to active material based fasteners, such as cable ties and twist ties, that can be reversible.

Fasteners such as hose clamps and cable ties are commonly employed at different stages of the manufacturing process to secure objects together such as a hose and a connector or a bundle of wire. In the case of a hose clamp, it can be difficult to ascertain visually whether the clamp has been tightened to a degree effective to prevent leakage. Even if adequately tightened during the initial assembly process in an amount effective to prevent leakage, it is possible that a hose clamp can loosen due to the vibrations of the operating environment. Still further, for automotive applications, metal-based hose clamps are used to connect radiator hoses to a radiator inlet that is subject to extensive thermal cycling. This exposure of the metal-based hose clamp to thermal cycling could adversely affect the properties of the metal, compromising the ability of the clamp to prevent leakage.

FIG. 1 illustrates an exemplary prior hose clamp 10 for use in securing a hose. Such hose clamps can be formed of an elongated member of stainless steel. As shown, a band 12 having first and second opposed ends which are overlapped to form an annular member includes outer stamped threads (or perforations) 14 and an adjustment assembly 16 in operative communication therewith to define a worm drive for selectively adjusting the diameter of the annular member. The adjustment assembly 16 includes drive gear having peripheral teeth that engage the stamped threads 14 whereby rotation of the gear results in the first and second ends moving to vary the circumference of the annular member. The drive gear is driven with an adjustment screw 17 that is positioned perpendicular to the annular member circumference for easier access. By adjusting the diameter of the annular member, a hose 18 can be removed or secured to a hose connector 20.

Current fasteners like the one shown in FIG. 1, including cable ties, can require the use of some physical action and/or mechanical action to engage or release an object. For example, the hose clamp 10 in FIG. 1 can be tightened or loosened around a hose by physically turning the adjustment screw 17. The use of mechanical parts to control the tightness of a fastener can be problematic since the operation of mechanical parts is likely to fail. Moreover, physically adjusting the tightness of multiple fasteners can become a tedious process. Additionally, access to the mechanical means of adjustment may be limited.

BRIEF SUMMARY

Disclosed herein are active material based fasteners such as cable ties and twist ties. In an embodiment, a fastener for securing an object comprises: a flexible elongated member capable of at least partially surrounding the object; and an adjustment mechanism in operable communication with the flexible elongated member, the adjustment mechanism comprising an active material capable of undergoing a change in a property upon exposure to an activation source, wherein the elongated member is configured to engage or release the object in response to the change in the property.

In another embodiment, a fastener for securing an object comprises: a flexible elongated member capable of at least partially surrounding the object and comprising a shape memory alloy (SMA) layer and a shape memory polymer (SMP) layer having a higher activation temperature than the SMA layer, the SMA layer and the SMP layer being capable of contracting to engage the object upon exposure to a higher temperature than the activation temperature of the SMP, and the SMP being capable of stiffening upon exposure to a lower temperature than the activation temperature of the SMP.

In yet another embodiment, a twist tie for securing an object comprises: a flexible elongated wire comprising an active material and having opposite ends that are capable of being placed in a twisted configuration.

The above described and other features are exemplified by the following Figs. and detailed description.

BRIEF DESCRIPTION OF THE DRAWINGS

Referring now to the Figures, which are exemplary embodiments and wherein the like elements are numbered alike.

DETAILED DESCRIPTION

Figure 1:
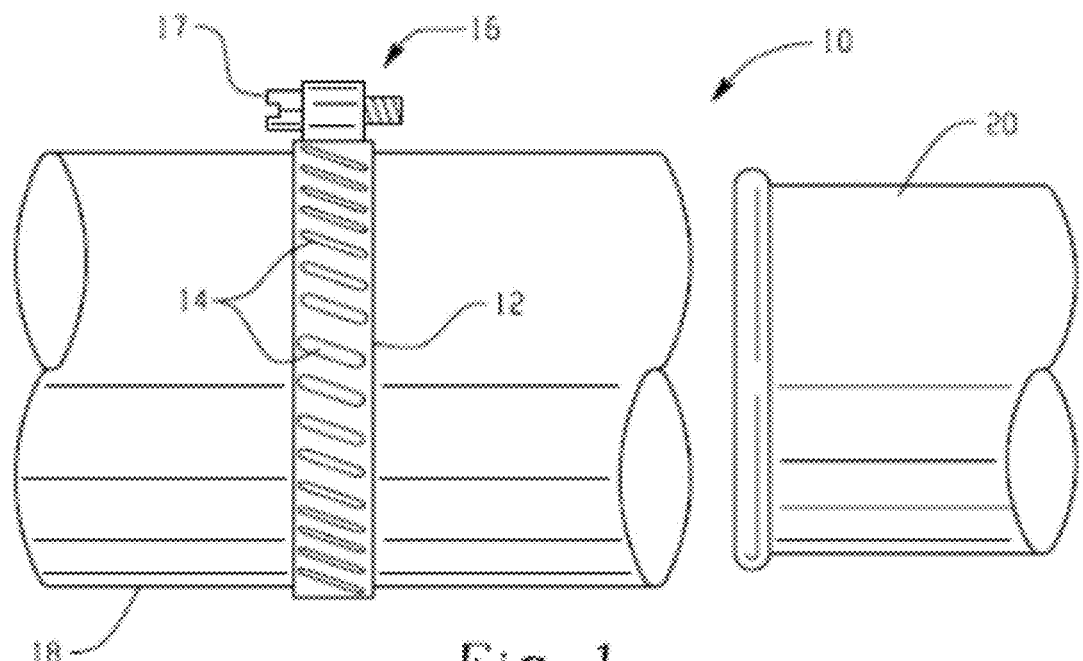
FIG. 1 is a side view of a prior art clamp for securing a hose.

Fasteners comprising a flexible member and an active material are described, wherein the flexible member is configured to engage or release an object in response to a change in a property of the active material. It is contemplated that the object could be one of a set of items or a bundle of items held together by the fastener. The fastener could be in the form of, for example, a cable tie or a twist tie. The term "active material" (also called "smart material") as used herein refers to several different classes of materials, all of which exhibit a change in at least one property, such as shape, dimension, geometry, flexural modulus, and stiffness, when exposed to at least one of many different types of activation sources. Examples of such activation sources include, but are not limited to, thermal, electrical, magnetic, and stress sources. Thus, the fastener can be exposed to the activation source, for example, a high temperature or low temperature environment, to cause the fastener to automatically engage or release the object. As such, the operation of the fastener advantageously can be performed remotely without any physical action. Further, this type of fastener avoids the use of mechanical parts that could fail. In addition, the fastener can be used to secure a hose to a hose fitting without being concerned that it could leak. The tightness of the fastener about the hose would only change when the active material is exposed to an activation source.

Suitable active materials for use in the fasteners include, but are not limited to, shape memory alloys ("SMAs"; e.g., thermal and stress activated shape memory alloys and magnetic shape memory alloys (MSMA)), electroactive polymers (EAPs) such as dielectric elastomers, piezoelectric materials (e.g., polymers, ceramics), shape memory polymers (SMPs), shape memory ceramics (SMCs), baroplastics, magnetorheological (MR) elastomers, electrorheological (ER) elastomers, electrostrictives, magnetostrictives, composites of the foregoing active materials with non-active materials, systems comprising at least one of the foregoing active materials, and combinations comprising at least one of the foregoing active materials. For convenience and by way of example, reference herein will be made to shape memory alloys and shape memory polymers. The shape memory ceramics, baroplastics, and the like, can be employed in a similar manner. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application or removal of external stimuli has led to their use in actuators to apply force resulting in desired motion. Active material actuators offer the potential for a reduction in actuator size, weight, volume, cost, noise and an increase in robustness in comparison with traditional electromechanical and hydraulic means of actuation. Ferromagnetic SMAs, for example, exhibit rapid dimensional changes of up to several percent in response to (and proportional to the strength of) an applied magnetic field. However, these changes are one-way changes and use the application of either a biasing force or a field reversal to return the ferromagnetic SMA to its starting configuration.

Shape memory alloys exhibit properties that are unique in that they are typically not found in other metals. In particular, they are alloy compositions with at least two different temperature-dependent phases or polarity. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as the austenite start temperature (As). The temperature at which this phenomenon is complete is often called the austenite finish temperature (Af). When the SMA is in the austenite phase and is cooled, it begins to change into the martensite phase, and the temperature at which this phenomenon starts is often referred to as the martensite start temperature (Ms). The temperature at which austenite finishes transforming to martensite is often called the martensite finish temperature (Mf). The range between As and Af is often referred to as the martensite-to-austenite transformation temperature range while that between Ms and Mf is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below As). Subsequent heating above the austenite start temperature causes the deformed shape memory material sample to begin to revert back to its original (nonstrained) permanent shape until completion at the austenite finish temperature. Thus, a suitable activation source or signal for use with shape memory alloys is a thermal activation source/signal having a magnitude that is sufficient to cause transformations between the martensite and austenite phases. Some shape memory alloys exhibit a one-way shape memory effect in that after being heated to transform them to the Austenite phase, they do not return to their deformed shape when cooled to at or below As. Another advantage of shape memory alloys over other metals is their good resistance to corrosion.

The temperature at which an SMA remembers its high temperature form (i.e., its original, nonstrained shape) when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition. The mechanical properties of the SMA vary greatly over the temperature range spanning their transformation, typically providing shape memory effect and superelastic effect. For example, in the martensite phase a lower elastic modulus than in the austenite phase is observed. When in the martensite phase, the SMA can undergo large deformations by realigning the crystal structure arrangement with the applied stress. The material will retain this shape after the stress is removed. The SMA also exhibits a phenomenon called superelasticity. When subjected to sufficient stress in its austenitic phase, it transforms to the martensitic phase. Such stress induced phase changes in the SMA are two-way by nature. Removal of the applied stress will cause the SMA to switch back to its Austenitic phase, and in so doing, recovering its starting shape and higher modulus.

Exemplary SMA materials include, but are not limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, combinations comprising at least one of the foregoing alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to that needed to deform the material) stresses, which can be as high as the inherent yield strength of the austenite material, sometimes up to three or more times that of the deformed martensite phase. For applications that require a large number of operating cycles, a recoverable strain of less than or equal to about 4% of the deformed length of wire used can be obtained.

MSMAs are alloys; often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

As previously mentioned, other exemplary shape memory materials are shape memory polymers (SMPs). "Shape memory polymer" generally refers to a polymeric material, which exhibits a change in a property, such as a modulus, a dimension, a coefficient of thermal expansion, the permeability to moisture, an optical property (e.g., transmissivity), or a combination comprising at least one of the foregoing properties in combination with a change in its microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electromagnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of H+ ion—the pH of the environment), or a combination comprising at least one of the foregoing.

Generally, SMPs are phase segregated co-polymers comprising at least two different units, which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-)crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs can demonstrate transitions between multiple temporary and permanent shapes.

SMPs exhibit a dramatic drop in modulus when heated above the glass transition temperature of that of their constituent that has a lower glass transition temperature. If loading/deformation is maintained while the temperature is dropped, the deformed shape can be set in the SMP until it is reheated while under no load to return to its as-molded original shape.

The active material can also comprise a piezoelectric material. Also, in certain embodiments, the piezoelectric material can be configured as an actuator for providing rapid activation. As used herein, the term "piezoelectric" is used to describe a material that mechanically deforms (changes shape) when a voltage potential is applied, or conversely, generates an electrical charge when mechanically deformed. Piezoelectrics exhibit a small change in dimensions when subjected to the applied voltage, with the response being proportional to the strength of the applied field and being quite fast (capable of easily reaching the thousand hertz range). Because their dimensional change is small (e.g., less than 0.1%), to dramatically increase the magnitude of dimensional change they are usually used in the form of piezo ceramic unimorph and bi-morph flat strip actuators, which are constructed so as to bow into a concave or convex shape or twist upon application of a relatively small voltage.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal band sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Exemplary piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, but are not limited to, poly(sodium 4-styrenesulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN") and their derivatives; polycarboxylic acids, including poly(methacrylic acid ("PMA"), and their derivatives; polyureas and their derivatives; polyurethanes ("PUE") and their derivatives; bio-polymer molecules such as poly-L-lactic acids and their derivatives, and membrane proteins, as well as phosphate bio-molecules; polyanilines and their derivatives, and all of the derivatives of tetraamines; polyimides, including Kapton® molecules and polyetherimide ("PEI"), and their derivatives; all of the membrane polymers; poly(N-vinyl pyrrolidone) ("PVP") homopolymer and its derivatives and random PVP-co-vinyl acetate ("PVAc") copolymers; all of the aromatic polymers with dipole moment groups in the main-chain or side-chains, or in both the main-chain and the side-chains; and combinations comprising at least one of the foregoing.

Further piezoelectric materials can include Pt, Pd, Ni, T, Cr, Fe, Ag, Au, Cu, and metal alloys comprising at least one of the foregoing, as well as combinations comprising at least one of the foregoing. These piezoelectric materials can also include, for example, metal oxides such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and combinations comprising at least one of the foregoing; and Group VIA and IIB compounds such as CdSe, CdS, GaAs, $AgCaSe_2$, ZnSe, GaP, InP, ZnS, and combinations comprising at least one of the foregoing.

Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include, but are not limited to, poly-alpha-olefins, natural rubber, silicone, polybutadiene, polyethylene, polyisoprene, and combinations comprising at least one of the foregoing.

The stiffness and potentially the shape of the polymer structure are attained by changing the shear and compression/tension moduli by varying the strength of the applied magnetic field. The MR polymers typically develop their structure when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state. Packaging of the coils for generating the applied field, however, creates challenges.

Suitable particles include, but are not limited to, iron; iron oxides (including $Fe_2O_3$ and $Fe_3O_4$); iron nitride; iron carbide; carbonyl iron; nickel; cobalt; chromium dioxide; and combinations comprising at least one of the foregoing; e.g., nickel alloys; cobalt alloys; iron alloys such as stainless steel, silicon steel, as well as others including aluminum, silicon, cobalt, nickel, vanadium, molybdenum, chromium, tungsten, manganese and/or copper. The particle size can be selected so that the particles exhibit multiple magnetic domain characteristics when subjected to a magnetic field. Particle diameters (e.g., as measured along a major axis of the particle) can be less than or equal to about 1,000 micrometers ($\mu$m) (e.g., about 0.1 micrometer to about 1,000 micrometers), specifically about 0.5 to about 500 micrometers, or more specifically about 10 to about 100 micrometers.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies.

Electroactive polymers include those polymeric materials that exhibit piezoelectric, pyroelectric, or electrostrictive properties in response to electrical or mechanical fields. An example of an electroactive polymer is an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer and/or rubber that deforms in response to an electrostatic force or whose deformation results in a change in electric field. Exemplary materials suitable for use as a pre-strained polymer include, but are not limited to, silicone elastomers, acrylic elastomers, polyurethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth), and combinations comprising at least one of the foregoing polymers.

Materials used as an electroactive polymer can be selected based on desired material propert(ies) such as a high electrical breakdown strength, a low modulus of elasticity (e.g., for large or small deformations), a high dielectric constant, and so forth. In one embodiment, the polymer can be selected such that is has an elastic modulus of less than or equal to about 100 MPa. In another embodiment, the polymer can be selected such that it has a maximum actuation pressure of about 0.05 megaPascals (MPa) to about 10 MPa, or more specifically about 0.3 MPa to about 3 MPa. In another embodiment, the polymer can be selected such that is has a dielectric constant of about 2 to about 20, or more specifically about 2.5 and to about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

Electroactive polymers can deflect at high strains, and electrodes attached to the polymers can also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying over time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes comprising varying out of plane dimensions, conductive greases (such as carbon greases and silver greases), colloidal suspensions, high aspect ratio conductive materials (such as carbon fibrils and carbon nanotubes, and mixtures of ionically conductive materials), as well as combinations comprising at least one of the foregoing.

Exemplary electrode materials can include, but are not limited to, graphite, carbon black, colloidal suspensions, metals (including silver and gold), filled gels and polymers (e.g., silver filled and carbon filled gels and polymers), ionically or electronically conductive polymers, and combinations comprising at least one of the foregoing. It is understood that certain electrode materials can work well with particular polymers but not as well with others. By way of example, carbon fibrils work well with acrylic elastomer polymers while not as well with silicone polymers.

Electrostrictives are dielectrics that produce a change of shape or mechanical deformation under the application of an electric field. Reversal of the electric field does not reverse the direction of the deformation. When an electric field is applied to an electrostrictive, it develops polarization(s). It then deforms, with the strain being proportional to the square of the polarization.

Magnetostrictives are solids that develop a mechanical deformation when subjected to an external magnetic field. This magnetostriction phenomenon is attributed to the rotations of small magnetic domains in the materials, which randomly oriented when the material is not exposed to a magnetic field. The shape change is largest in ferromagnetic or ferromagnetic solids. These materials possess a very fast response capability, with the strain proportional to the strength of the applied magnetic field, and they return to their starting dimension upon removal of the field. However, these materials have maximum strains of about 0.1 to about 0.2 percent.

Figure 2:
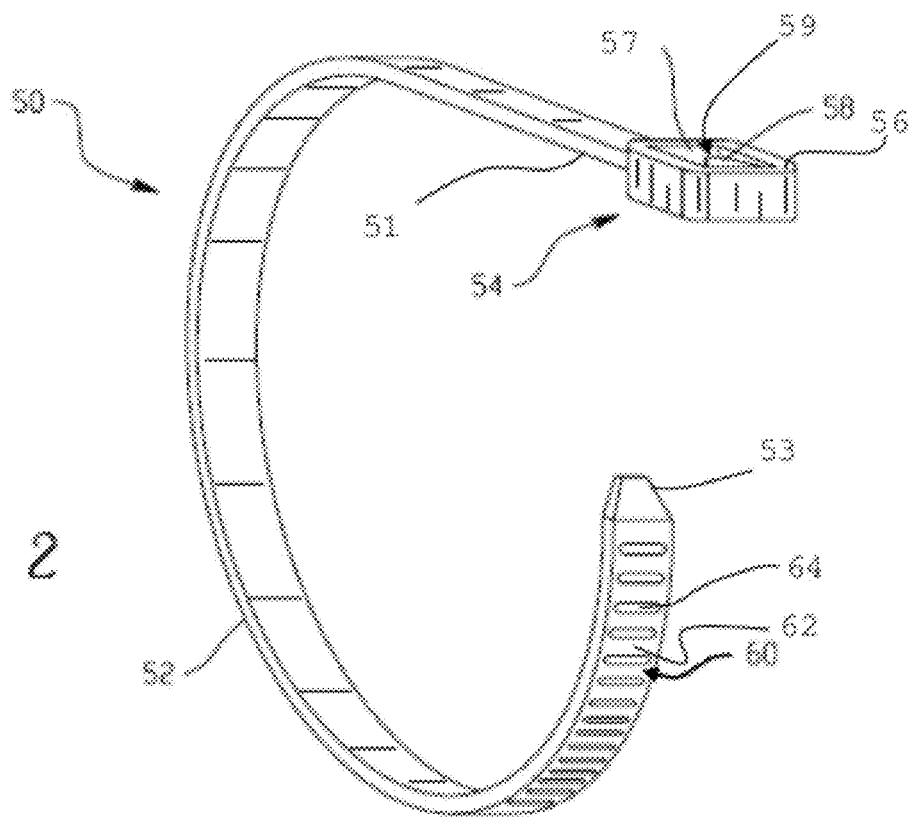
FIG. 2 is a perspective view of a cable tie comprising an active material.

FIG. 2 illustrates an exemplary embodiment of a fastener in the form of a cable tie 50, which includes a flexible elongated member 52 or strap and an adjustment mechanism 54 disposed at one end 51 of the member 52, all molded as a single piece. The adjustment mechanism 54 includes a housing 56 that defines an aperture 57 for receiving the opposite end 53 of the elongated member 52. One or more end teeth 59, e.g., a barb 58, are attached to the housing 56. The elongated member 52 includes a plurality of engageable portions 60 spaced about an outer surface of the member 52.

In one embodiment, the one or more end teeth 59 comprise an active material and are configured to engage or release at least one of the engageable portions 60 in response to the active material undergoing a change in property upon exposure to an activation source. The one or more end teeth 59 can be composed of, for example, an SMP. By way of example, the cable tie 50 can be fastened while the SMP is in a hardened state by pulling the free end of the elongated member 52 through the aperture 56 until the member 52 is tightly positioned around an object. At this point, the barb 58 engages one of the engageable portions 60 such that the elongated member 52 cannot be refracted while the SMP is in a hardened state. In order to release the object, the cable tie 50 can be heated at a temperature effective to soften the SMP, allowing the barb 58 to disengage from the engageable portion 60 when the end of the elongated member 52 is manually pulled back through the housing 56. Alternatively, a spring can be attached to the elongated member 52 such that it extends along a length thereof, and upon the softening of the SMP, the spring can cause the barb 58 to automatically disengage from the engageable portion 60. Yet another alternative would be to include an SMA element in the elongated member 52 that is pre-strained in the cold state and that shortens in response to heating the cable tie 50 above Af at the same time that the barb 58 softens.

In another embodiment, each engageable portion 60 includes a slot 62 and one or more receiving teeth 64 extending from the slot 62 that are configured to mate with the one or more end teeth 59 extending from the housing 56. The one or more receiving teeth 64 of the engageable portions 60 can comprise an SMP to provide for the release of the cable tie 50 upon the softening of the SMP in the same manner as described above with reference to the barb 58. The SMP can be present in either or both of the end teeth attached to the housing 56 and the receiving teeth 64 attached to the engageable portions 60.

In another embodiment, each engageable portion 60 includes a slot and one or more teeth extending from the slot that are configured to mate with the one or more teeth extending from the housing 56. The one or more teeth of the engageable portions 60 can comprise an SMP to provide for the release of the cable tie 50 upon the softening of the SMP in the same manner as described above with reference to the barb 58. The SMP can be present in either or both of the teeth attached to the housing 56 and the teeth attached to the engageable portions 60.

In still another embodiment, the one or more teeth of the cable tie 50 can comprise an SMA element having a memorized flat shape embedded in or layered with an elastic material such as a spring steel of matching geometry. The teeth can be pre-strained into the shape useful for engaging the engageable portions 60, e.g., a pyramidal three-dimensional shape. The cable tie 50 can then be heated above the $A_f$ of the SMA to cause the teeth to return to their flattened shape, allowing the teeth to disengage the engageable portions 60 when the end of the elongated member 52 is manually pulled back through the housing 56. Alternatively, a spring can be attached to the elongated member 52 such that it extends along a length thereof, and upon the heating of the SMA, the spring can cause the teeth to automatically disengage from the engageable portion 60. Yet another alternative would be to include an SMA element in the elongated member 52 that is pre-strained in the cold state and that shortens in response to heating the cable tie 50 above the $A_f$ of the SMA at the same time that the teeth become flat.

In an additional embodiment, the elongated member 52 comprises a pseudoplastically stretched SMA embedded in a flexible material such as a soft rubber. The elongated member 52 can be loosely fastened around an object and then heated above its $A_f$ to cause it to contract and thus tighten around the object. In an alternative embodiment, the SMA of the elongated member 52 can be embedded in or layered with an SMP having a higher activation temperature than the SMA. The elongated member 52 can be heated at a higher temperature than the activation temperature of the SMP to cause the member 52 to soften and contract. It can then be cooled to a temperature between the activation temperatures of the SMA and the SMP to cause the SMP to stiffen and thus lock the elongated member 52 in the tightened position around the object.

Figure 3:
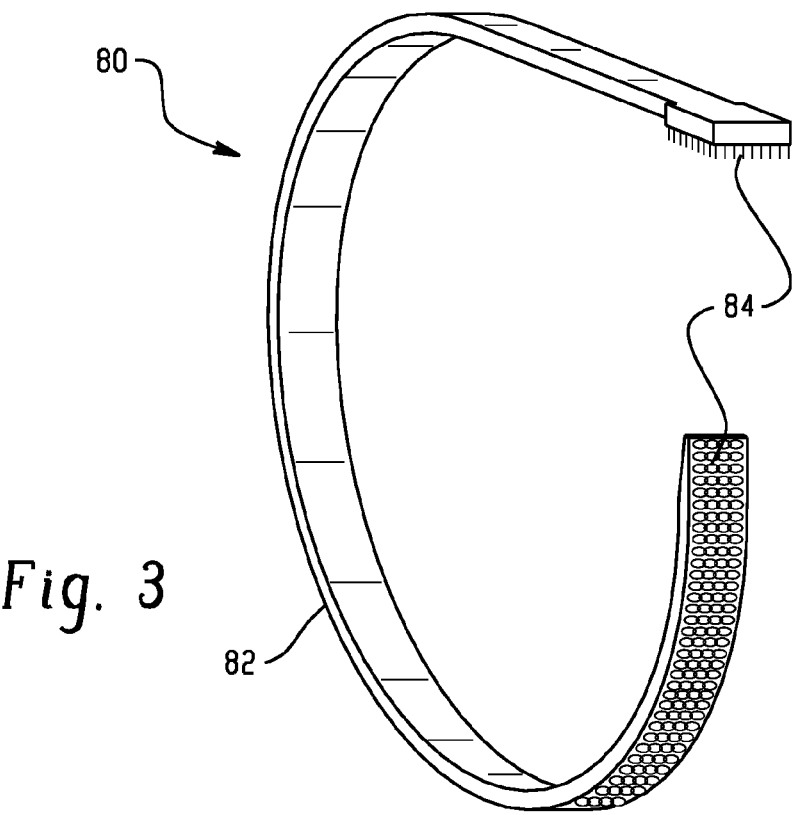
FIG. 3 is a perspective view of a hook and loop fastener including an elongated member and a hook and loop mechanism disposed at the ends of the elongated member.
Figure 4:
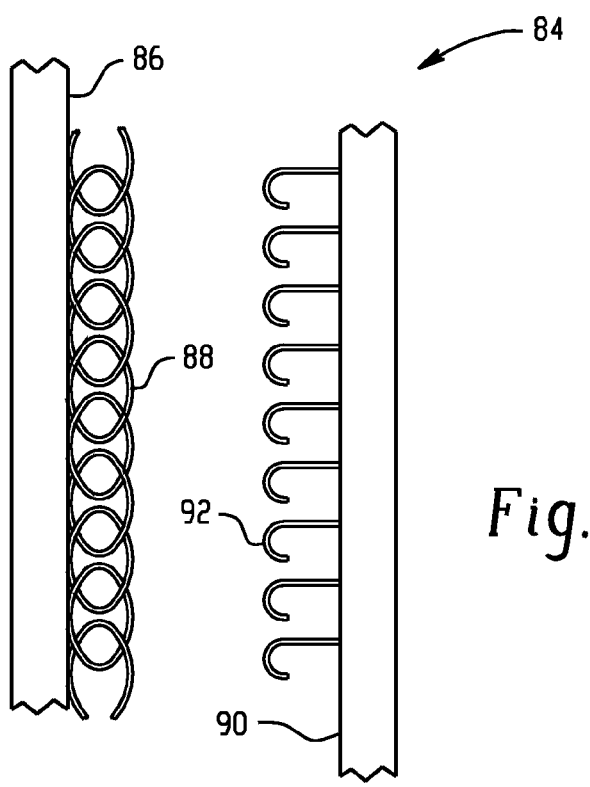
FIG. 4 is a side plan view of the hook and loop mechanism of the fastener shown in FIG. 3.

In another exemplary embodiment shown in FIG. 3, the active material based fastener can be in the form of a hook and loop fastener 80 that includes an elongated member 82 similar to the elongated member described in previous embodiments and a hook and loop mechanism 84 at the opposite ends of the member 82. As shown in FIG. 4, the hook and loop mechanism 84 comprises a plurality of loops 88 extending from a first surface 86 disposed at one end of the elongated member 82 and a plurality of hooks 92 extending from a second surface 90 disposed at another end of the elongated member 82. The hooks 92 are shaped to engage with the loops 88 upon contacting the loops 88. While the hooks 92 are shown as having an inverted J-shape and the loops 88 are shown as having a random looped pattern, it is understood that they could take the form of various other shapes that allow the hooks 92 and the loops 88 to interlock. For example, the hooks 92 could have a mushroom shape, a knob shape, an anchor shape, a T-shape, etc., and the loops 88 could have a shape complementary to the shape of the hooks 92. Suitable loop materials are commercially available. Examples of such loop materials include but are not limited to thermoplastics such as polypropylene, polyethylene, polyamide, polyester, polystyrene, polyvinyl chloride, acetal, acrylic, polycarbonate, polyphenylene oxide, polyurethane, polysulfone, and combinations comprising at least one of the foregoing. The loop material can be integrated with its support or can be attached to the support. The hooks 92 comprise an active material attached to the support and are thus capable of releasing the plurality of loops 88 in response to receiving an activation source such as a thermal activation source.

The fastener 80 can be used to secure an object by placing it tightly around the object and contacting the hooks 92 to the loops 88 to allow them to engage, holding the fastener 80 in place. The length of the hook and loop fasteners can be varied to allow the fastener 80 to be tightly secured around the object. In one embodiment, the hooks 92 are made of an SMA having a memorized straight shape and being pre-strained into the engaging shape (e.g., the inverted J shape). The fastener 80 thus can be heated above the $A_s$ of the SMA to cause the SMA hooks 92 to straighten and thus automatically release the loops 88.

Figure 5:
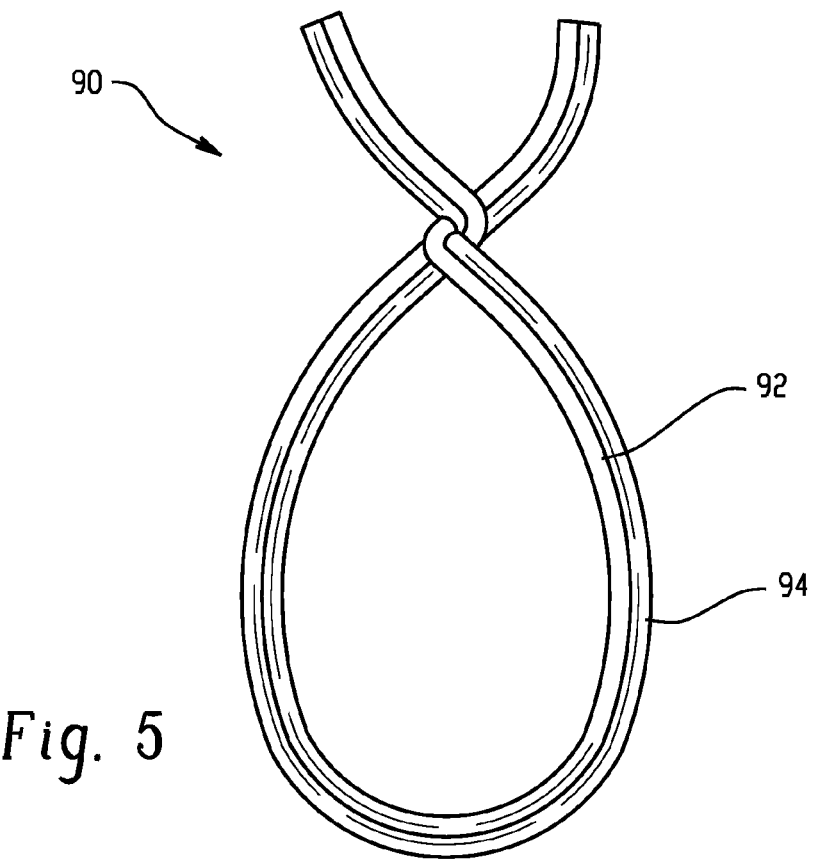
FIG. 5 is a side plan view of a twist tie comprising an active material.
Figure 6:
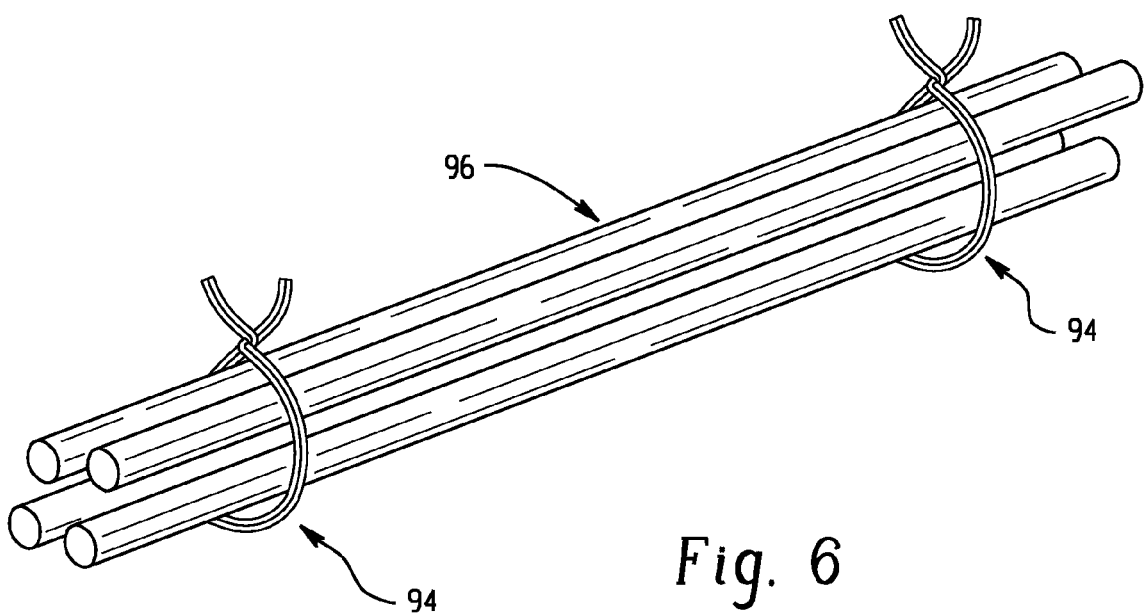
FIG. 6 is a perspective view of a bundle being held together by twist ties like the one depicted in FIG. 5.

In yet another exemplary embodiment shown in FIG. 5, the active material based fastener can be in the form of a twist tie 90 comprising a flexible, elongated member 92 such as a wire. The elongated member 92 can be, but is not necessarily, enclosed within a flexible sheath 94. In one embodiment, the elongated member 92 is less flexible than the sheath 92. The ends of the twist tie 94 can be twisted together to tighten around an object. By way of example, FIG. 6 depicts multiple twist ties 94 being used to hold a bundle of material together. The composition and shape of the flexible sheath 94 can vary. For example, it can be composed of paper, plastic, etc. and can be flat or tubular shaped, etc. The elongated member 92 comprises an active material. In one embodiment, the elongated member 92 is an SMA having as its memorized shape the twisted configuration shown in FIG. 10. Before its use, the twist tie 90 can be pseudoplastically deformed into a straight configuration. In order to secure an object, the twist tie 90 can be placed adjacent to the object and then heated to above the $A_s$ of the SMA to cause it to automatically assume its twisted configuration and thus tighten around the object. The twist tie 90 can be manually untwisted from its position around the object when desired. In an alternative embodiment, the SMA has a memorized straight configuration and thus the twist tie 90 can be manually twisted around an object. In this embodiment, the twist tie can be released by heating it above the $A_s$ of the SMA to cause it to automatically straighten.

In another embodiment, the elongated member 92 of the twist tie 90 is an SMA having a memorized twisted configuration, and the sheath 94 is made of a material having an elastic modulus between that of the martinsite ($\square$35 GPa) and the austenite ($\square$80 GPa) phases of the SMA (e.g., aluminum). Thus, the twist tie 90 can be used to secure an object by heating it above the $A_s$ of the SMA to cause it to return to its twisted configuration. It can also be cooled to below the $A_s$ to cause it to automatically form a straight configuration and thus release the object.

In yet another embodiment, the elongated member 92 is an SMA and the sheath 94 is an SMP having a higher activation temperature than the SMA. The SMA has a memorized twisted configuration. Thus, the twist tie 90 can be heated at a temperature above the activation temperature of the SMP to cause the SMA to assume its twisted configuration and the SMP to soften. The twist tie 90 can then be cooled to a temperature between the activation temperatures of the SMA and the SMP to harden the SMP, locking the twist tie 90 in the twisted configuration. This embodiment can be employed to irreversibly secure an object to one or more other objects.

In still another embodiment, the elongated member 92 is made of an elastic material not comprising an active material, such as spring steel or an elastomer with a suitably high modulus (greater than that of the SMP in its heated state), and the sheath 94 is an SMP. The twist tie 90 can be heated to a temperature above the activation temperature of the SMP to cause the SMP to soften, allowing the twist tie 90 to be manually twisted around an object. The twist tie 90 can then be cooled while holding it in its twisted state to a temperature below the activation temperatures of the SMP to harden the SMP, locking the twist tie 90 in the twisted configuration. Reheating the SMP so that it softens will allow the elastic material to return the twist tie to its starting geometry.

In an additional embodiment, the elongated member 92 is made of a reinforcing material such as a flexible metal wire, e.g., an aluminum wire, and the sheath 94 is an SMP. The twist tie 90 can be heated to a temperature above the activation temperature of the SMP to cause the SMP to soften, allowing the twist tie 90 to be manually twisted around an object. The twist tie 90 can then be cooled to a temperature below the activation temperature of the SMP to harden the SMP, locking the twist tie 90 in the twisted configuration. The elongated member 92 could serve to hold the sheath 94 in its twisted configuration while it is being cooled. If desired, the SMP can be re-heated to allow the twist tie 90 to be untwisted, thus releasing its grasp on the object.

As used herein, the terms "a" and "an" do not denote a limitation of quantity, but rather denote the presence of at least one of the referenced items. Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A fastener, comprising:
a flexible elongated member including:
   a first end;
   a second end spaced opposite the first end;
   an outer surface; and
   a plurality of engageable portions spaced about the outer surface, wherein the flexible elongated member includes a shape-memory alloy transitionable between a martensite phase and an austenite phase; and
an adjustment mechanism disposed at the first end and including:
   a housing defining an aperture therethrough; and
   one or more end teeth each extendable from the housing into the aperture and comprising an active material having a first temperature-dependent state and a second temperature-dependent state, wherein the active material is reversibly transitionable between the first temperature-dependent state and the second temperature-dependent state in response to a thermal activation source;

wherein the flexible elongated member and the adjustment mechanism are a single piece and the second end is reversibly insertable into the aperture;

wherein the one or more end teeth have a first temperature-dependent shape when the active material has the first temperature-dependent state, and a second temperature-dependent shape when the active material has the second temperature-dependent state, and further wherein the one or more end teeth are transitionable between the first temperature-dependent shape and the second temperature-dependent shape in response to the thermal activation source;

wherein the one or more end teeth are flattened against the housing when the one or more end teeth have the first temperature-dependent shape, and wherein the one or more end teeth extend from the housing when the one or more end teeth have the second temperature-dependent shape;

wherein the one or more end teeth engage at least one of the plurality of engagement portions so that the flexible elongated member is not removable through the aperture when the one or more end teeth have the second temperature-dependent shape;

wherein the one or more end teeth do not engage the at least one of the plurality of engagement portions so that the second end is removable through the aperture when the one or more end teeth have the first temperature-dependent shape;

wherein the flexible elongated member shortens when both the shape-memory alloy transitions from the martensite phase to the austenite phase and the active material transitions from the second temperature-dependent state to the first temperature-dependent state so that the second end is automatically removable from the aperture;

wherein the active material is selected from a group consisting of shape memory polymers, composites of at least one shape-memory polymer and a non-active material, and combinations thereof.

2. The fastener of claim 1, wherein the one or more end teeth engage or release the at least one of the plurality of engageable portions in response to a change in a temperature of the active material.

3. The fastener of claim 1, wherein each of the plurality of engageable portions defines a slot and includes one or more receiving teeth each extendable from the slot, and further wherein the one or more receiving teeth comprise the active material and are configured to engage or release the one or more end teeth as the active material transitions between the first temperature-dependent state and the second temperature-dependent state.

4. The fastener of claim 1, wherein the one or more end teeth disengage the at least one of the plurality of engageable portions in response to an increase in a temperature of the active material so that the second end is removable through the aperture.

5. A fastener, comprising:
a flexible elongated member including:
 a first end;
 a second end spaced opposite the first end;
 an outer surface; and
 a plurality of engageable portions spaced about the outer surface; and
an adjustment mechanism disposed at the first end and including:
 a housing defining an aperture therethrough; and
 one or more end teeth each extendable from the housing into the aperture and comprising an active material having a first temperature-dependent state and a second temperature-dependent state, wherein the active material is reversibly transitionable between the first temperature-dependent state and the second temperature-dependent state in response to a thermal activation source;

wherein the flexible elongated member and the adjustment mechanism are a single piece and the second end is reversibly insertable into the aperture;

wherein the one or more end teeth have a first temperature-dependent shape or a first temperature-dependent modulus when the active material has the first temperature-dependent state, and a second temperature-dependent shape or a second temperature-dependent modulus when the active material has the second temperature-dependent state, and further wherein the one or more end teeth are reversibly transitionable between the first temperature-dependent modulus and the second temperature-dependent modulus in response to the thermal activation source, and are transitionable between the first temperature-dependent shape and the second temperature-dependent shape in response to the thermal activation source;

wherein the one or more end teeth engage at least one of the plurality of engagement portions so that the flexible elongated member is not removable through the aperture when the one or more end teeth have the second temperature-dependent shape and the second temperature-dependent modulus;

wherein the one or more end teeth do not engage the at least one of the plurality of engagement portions so that the second end is removable through the aperture when the one or more end teeth have the first temperature-dependent shape and the first temperature-dependent modulus.

6. The fastener of claim 5, wherein the second end is insertable into the aperture when the active material has the second temperature-dependent state, and further wherein the second end is removable through the aperture by manually pulling on the flexible elongated member when the active material has the first temperature-dependent state.

7. The fastener of claim 5, wherein the flexible elongated member comprises a shape-memory alloy transitionable between a martensite phase and an austenite phase, and further wherein the flexible elongated member shortens when both the shape-memory alloy transitions from the martensite phase to the austenite phase and the active material transitions from the second temperature-dependent state to the first temperature-dependent state so that the second end is automatically removable from the aperture.

8. The fastener of claim 7, wherein the second end is insertable into the aperture when the active material has the second temperature-dependent state, and further wherein the second end is removable through the aperture without manually pulling on the flexible elongated member when the active material has the first temperature-dependent state.

9. The fastener of claim 5, wherein the flexible elongated member comprises a shape-memory alloy embedded in a flexible material and transitionable between a martensite phase and an austenite phase, and further wherein the flexible elongated member contracts when both the shape-memory alloy transitions from the martensite phase to the austenite phase and the active material transitions from the first temperature-dependent state to the second temperature-dependent state so that the one or more end teeth engage the at least one of the plurality of engagement portions to thereby retain the flexible elongated member within the aperture.

10. The fastener of claim 5,
wherein the flexible elongated member comprises a shape-memory alloy embedded in a shape-memory polymer;
wherein the shape-memory alloy is transitionable between a martensite phase and an austenite phase, and the shape-memory polymer is transitionable between a soft temperature-dependent state and a hard temperature-dependent state;
wherein the flexible elongated member has a first modulus when the shape-memory polymer has the soft temperature-dependent state, and has a second modulus when the shape-memory polymer has the hard temperature-dependent state that is comparatively stiffer than the soft temperature-dependent state;
wherein the shape-memory alloy has a first activation temperature at which the shape-memory alloy transitions from the martensite phase to the austenite phase, and the shape-memory polymer has a second activation temperature at which the shape-memory polymer transitions from the hard temperature-dependent state to the soft temperature-dependent state; and
further wherein the second activation temperature is greater than the first activation temperature.

11. The fastener of claim 10,
wherein the second end is inserted into the aperture;
wherein the flexible elongated member softens at a third temperature that is higher than the second activation temperature;
wherein the shape-memory polymer stiffens at a fourth temperature that is greater than the first activation temperature and less than the second activation temperature; and
further wherein the flexible elongated member contracts when the shape-memory alloy transitions from the martensite phase to the austenite phase, the shape-memory polymer transitions from the hard temperature-dependent state to the soft temperature-dependent state, and the active material transitions from the first temperature-dependent state to the second temperature-dependent state so that the one or more end teeth engage the at least one of the plurality of engagement portions to thereby retain the flexible elongated member within the aperture.

12. The fastener of claim 5, wherein the one or more end teeth disengage the at least one of the plurality of engageable portions in response to an increase in a temperature of the active material.

13. The fastener of claim 12, wherein the one or more end teeth are flattened against the housing when the one or more end teeth have the first temperature-dependent shape and the first temperature-dependent modulus, and wherein the one or more end teeth extend from the housing when the one or more end teeth have the second temperature-dependent shape and the second temperature-dependent modulus.

14. The fastener of claim 5, wherein the active material is selected from a group consisting of shape memory polymers, composites of at least one shape memory polymer and a non-active material, and combinations thereof.

15. A fastener, comprising:
a flexible elongated member including:
a first end;
a second end spaced opposite the first end;
an outer surface; and
a plurality of engageable portions spaced about the outer surface, wherein each of the plurality of engageable portions defines a slot and includes one or more receiving teeth each extendable from the slot and comprising an active material having a first temperature-dependent state and a second temperature-dependent state;
wherein the active material is reversibly transitionable between the first temperature-dependent state and the second temperature-dependent state in response to a thermal activation source; and
an adjustment mechanism disposed at the first end and including:
a housing defining an aperture therethrough; and
one or more end teeth each extendable from the housing into the aperture and comprising the active material;
wherein the flexible elongated member and the adjustment mechanism are a single piece and the second end is reversibly insertable into the aperture;
wherein the one or more receiving teeth and the one or more end teeth have a first temperature-dependent shape or a first temperature-dependent modulus when the active material has the first temperature-dependent state, and a second temperature-dependent shape or a second temperature-dependent modulus when the active material has the second temperature-dependent state, and further wherein the one or more receiving teeth and the one or more end teeth are reversibly transitionable between the first temperature-dependent modulus and the second temperature-dependent modulus in response to the thermal activation source, and are transitionable between the first temperature-dependent shape and the second temperature-dependent shape in response to the thermal activation source;
wherein the one or more end teeth engage at least one of the one or more receiving teeth so that the flexible elongated member is not removable through the aperture when the one or more end teeth have the second temperature-dependent shape and the second temperature-dependent modulus;
wherein the one or more end teeth do not engage the at least one of the one or more receiving teeth so that the second end is removable through the aperture when the one or more end teeth have the first temperature-dependent shape and the first temperature-dependent modulus.

16. The fastener of claim 15, wherein the second end is insertable into the aperture when the active material has the second temperature-dependent state, and further wherein the second end is removable through the aperture by manually pulling on the flexible elongated member when the active material has the first temperature-dependent state.

17. The fastener of claim 15, wherein the flexible elongated member comprises a shape-memory alloy transitionable between a martensite phase and an austenite phase, and further wherein the flexible elongated member shortens when both the shape-memory alloy transitions from the martensite phase to the austenite phase and the active material transitions from the second temperature-dependent state to the first temperature-dependent state so that the second end is automatically removed from the aperture.

18. The fastener of claim 15, wherein the one or more end teeth disengage the at least one of the plurality of engageable portions in response to an increase in a temperature of the active material.

19. The fastener of claim 15, wherein the one or more end teeth are flattened against the housing when the one or more end teeth have the first temperature-dependent shape, and wherein the one or more end teeth mate with the one or more receiving teeth when the one or more end teeth have the second temperature-dependent shape.

20. The fastener of claim 15, wherein the active material is selected from a group consisting of shape memory polymers, composites of at least one shape memory polymer and a non-active material, and combinations thereof.

* * * * *